Aug. 12, 1969 P. R. HOFFMAN 3,461,435

PNEUMATIC MEMORY WITH ELECTRICAL READ-OUT MEANS

Filed Nov. 4, 1966

INVENTOR.
PAUL R. HOFFMAN
BY Samuel Kane
ATTORNEY

United States Patent Office 3,461,435
Patented Aug. 12, 1969

3,461,435

PNEUMATIC MEMORY WITH ELECTRICAL READ-OUT MEANS

Paul R. Hoffman, Farmington, Mich., assignor to Burroughs Corporation, Detroit, Mich., a corporation of Michigan

Filed Nov. 4, 1966, Ser. No. 592,038
Int. Cl. G11b *9/00*
U.S. Cl. 340—173 6 Claims

This invention relates generally to digital computing systems and more particularly to improvements in digital storage devices, also known as memories.

An object of the invention is to provide improvements in binary digital storage devices.

Another object of the invention is to provide a bistable memory characterized by its use of low-cost pneumatic techniques.

A further object of the invention is to provide a pneumatic memory having permanent and erasable storage capabilities.

Another object of the invention is to provide such a memory with nondestructive readout.

In accordance with the above objects and considered first in one of its broader aspects, the invention comprises first and second substantially parallel discs arranged to be rotated as a unit and having their confronting faces adjacent to each other. Each disc represents a binary digit and has a row of holes extending through its thickness. The holes in one disc are aligned with the holes in the other disc to form pairs of corresponding holes, each pair of holes constituting one binary bit.

A plurality of ball elements are provided, each residing in one of the holes of each pair of holes and adapted to be moved back and forth from one hole to the other of the associated pair. A retaining means is provided for confining each ball to its associated pair of holes, and further means are provided for rotating the discs during operation of the memory.

There is also provided a first conduit means for selectively conducting a flow of fluid under pressure into a selected hole of the rotating first disc to force a ball out of the selected hole and into the corresponding hole in the rotating second disc, and second conduit means for selectively conducting a flow of fluid under pressure into a selected hole of the rotating second disc to force a ball out of the selected hole in the rotating second disc and into the corresponding hole in the rotating first disc.

Figure 1:
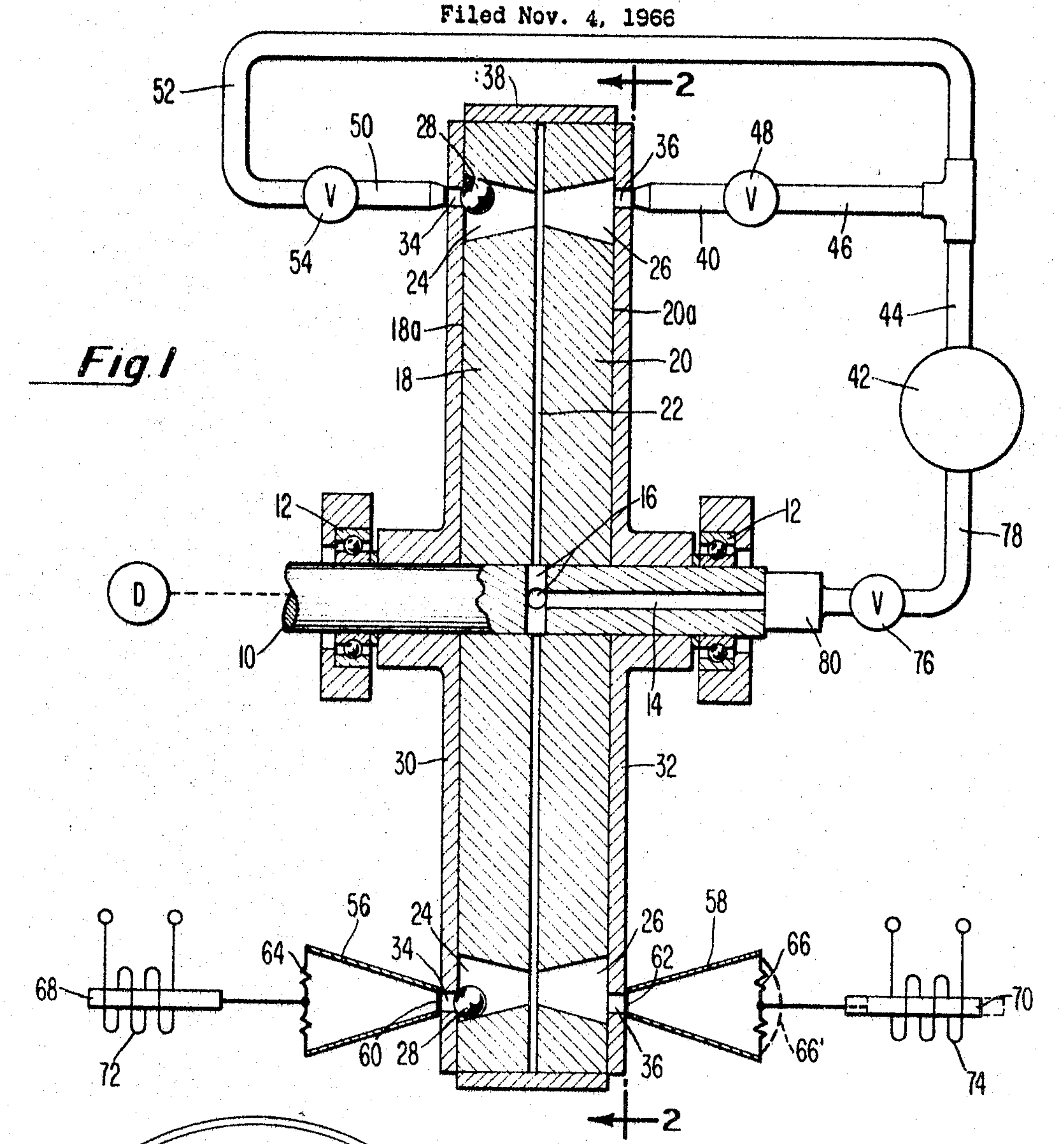
Figure 2:
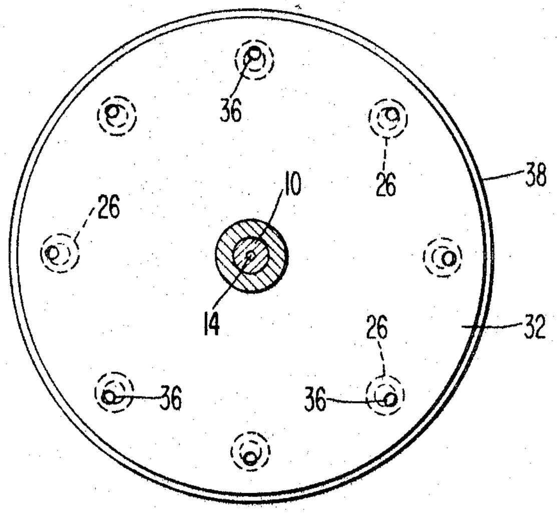

The invention will be more clearly under stood when the following detailed description of the preferred embodiment thereof is read in conjunction with the accompanying drawings in which, FIG. 1 shows an apparatus, partially diagrammatic and partially in section, constructed in accordance with the invention; and FIG. 2 is a sectional view taken along line 2—2 of FIG. 1.

Referring now to the drawings, a shaft 10 is rotatably mounted in bearings 12 of the particular machine or system in which the present invention may be employed. The shaft 10 is provided with an axial bore 14 and radial bores 16 which communicate with the axial bore 14. The shaft 10 is rotated during operation by any suitable driving mechanism D.

Two binary discs 18 and 20 are mounted on the shaft 10 in spaced relation with a small gap 22 between them, the gap 22 being in line with the radial bores 16. The discs 18 and 20 may be secured to the shaft 10 in any suitable manner for rotation therewith.

Disc 18 is provided with an annular row of holes 24 concentric with the axis of rotation of the shaft 10, and disc 20 is similarly provided with an annular row of holes 26 concentric with the axis of rotation of the shaft 10.

As shown in FIG. 1, the discs 18 and 20 are arranged so that the holes 24 and 26 are aligned to form pairs, each pair constituting one binary bit. The holes 24 and 26 are conical and are arranged with their larger diameters at the outer faces 18*a* and 20*a* of the discs, and with their smaller diameters at the gap 22.

A ball 28 is placed in each pair of holes 24, 26. The smaller diameter of the holes 24 and 26 is just large enough to allow ready passage of its associated ball 28 from one disc 18 or 20 to the other. The gap 22 between the discs must be no wider than about ⅙ to ¼ of the diameter of a ball 28 so as not to interfere with the free movement of the ball 28 across the gap 22 when the ball is passing from one hole 24 or 26 to the other. If a ball 28 is in a hole 24 it may arbitrarily be considered to represent the storage of a binary "0," in which case the disc 18 may be regarded as the "0" disc. Then, if a ball 28 is in a hole 26 in the disc 20 it will be regarded as storing a binary "1," and the disc 20 may therefore be regarded as the "1" disc.

Two cover plates 30 and 32 are fastened to the surfaces 18*a* and 20*a* of the discs to provide a means for retaining the balls 28 in the holes 24 and 26. The covers 30 and 32 are provided with annular rows of ports 34 and 36, respectively, which communicate with the holes 24 and 26. The inner edge of each port 34 and 36 serves as a valve seat for the associated ball 28. Thus, when the discs are rotating, as depicted by the drawings, centrifugal force will urge each ball 28 outwardly against the conical surface of the particular hole 24 or 26 in which the ball happens to be at the moment, with the result that the balls will be given an additional lateral component of motion to seat them on the inner edge of the ports 34 and 36, and thereby block the flow of fluid through these ports, as will appear more clearly hereinafter.

In addition to the side covers 30 and 32, there is also secured to the discs 18 and 20 a circular outer cover 38 for preventing the escape of fluid from the gap 22 at the outer periphery of the discs 18 and 20, as will appear shortly.

Fluid under pressure may be applied to a nozzle 40 from a supply of compressed fluid 42 through pipes 44 and 46, and a valve 48, and to a nozzle 50 through the pipe 44, a pipe 52 and a valve 54. The nozzles 40 and 50 are stationary and in line, respectively, with the rows of ports 36 and 34.

When the memory is in operation, the disc assembly is rotating with the shaft 10. To write or store a "1" in a particular location represented by a pair of holes 24, 26, a pulse of compressed fluid must be applied to the nozzle 50 by opening the valve 54 at the proper instant. This pulse of fluid will flow through the particular port 34 and force the ball 28 out of its hole 24 and across the gap 22 and into the corresponding hole 26 of the disc 20. If a ball 28 happens to be in a hole 26, representing the storage of a "1," and it is desired to write a "0" at this location, a pulse of compressed fluid must be applied to the nozzle 40 by opening the valve 48 at the proper instant to force the ball from the disc 20 to the disc 18. If a ball 28 is already in the desired location it merely remains there.

For obtaining read-out functions there are provided two stationary fluid pressure pick-up vessels 56 and 58 positioned as close to the covers 30 and 32 as tolerances will permit. Each of the vessels 56 and 58 is open at one end 60 and 62, respectively, and is provided with a diaphragm 64 or 66 sealing its other end. Magnets 68 and 70 are secured, respectively, to the diaphragms 64 and 66 and are inductively coupled, respectively, to coils 72 and 74.

In the read operation, fluid under pressure is forced to flow radially outwardly through the gap 22. This is accomplished by opening a valve 76 so that fluid will flow from the source 42 and through a pipe 78, the valve 76, a rotatable joint 80, the bore 14 and radial bores 16. Fluid will therefore escape from the gap 22 through all ports 34 and 36 which are not closed by a ball 28. As the assembly revolves, the fluid escaping out of an open port 36, for example, will enter the open end 62 of the vessel 58 and momentarily increase the pressure in the vessel 58 to cause the diaphragm 66 to deflect outwardly as depicted by the phantom line 66' to thereby move the magnetic core 70 and cause a signal to be generated in the coil 74 thereby to signify the storage of a "0." If a ball 28 happens to be in a hole 26 sealing a port 36, the fluid escaping from the corresponding hole 24 and port 34 will similarly cause a signal to be generated in the coil 72, thereby to indicate the storage of a "1."

As indicated previously, centrifugal force and the conical shape of the holes 24 and 26 serve to detent the balls 28 in the particular disc 18 or 20 in which they happen to be in at any particular moment and keep the balls 28 seated against the associated ports 34 or 36. Another feature of the conical shape of the holes 24 and 26 is that whenever the discs 18 and 20 are not rotating, the balls 28 will not roll from one disc to the other but will remain in their correct positions. This latter feature assumes that the axis of rotation of shaft 10 is horizontal, or substantially horizontal, and that the environment is relatively vibration-free.

While there has been shown and described a specific memory apparatus to exemplify the principles of the invention, it is to be understood that this is but one embodiment of the invention and that the invention is capable of being constructed in a variety of shapes, sizes and modifications without departing from the true spirit and scope thereof. Accordingly, the invention is not to be limited by the specific memory disclosed, but only by the subjoined claims.

What is claimed is:

1. A pneumatic memory comprising first and second substantially parallel discs arranged to be rotated as a unit and having their confronting faces adjacent to each other, each disc representing a binary digit and having a row of holes extending through its thickness and with the holes in one disc aligned with the holes in the other disc to form pairs of corresponding holes, each pair of holes constituting a binary bit, a plurality of balls each residing in one of the holes of each pair of holes and adapted to be moved back and forth from one hole to the other of the associated pair, means for retaining each ball in its associated pair of holes, means for rotating said discs, first conduit means for selectively conducting a flow of fluid under pressure into a selected hole of said rotating first disc to force a ball out of said selected hole and into the corresponding hole in said rotating second disc, and second conduit beans for selectively conducting a flow of fluid under pressure into a selected hole of said rotating second disc to force a ball out of the selected hole in said rotating second disc and into the corresponding hole in said rotating first disc.

2. A pneumatic memory according to claim 1 wherein said retaining means comprises individual covers on the outside surfaces of said discs, each cover having a row of ports each opening into one of said holes for admitting said fluid into the associated hole and each port having a diameter which is less than the diameter of a ball.

3. A pneumatic memory according to claim 2 wherein, when said discs are rotating, each ball seats against and closes the port which opens into the hole in which the ball happens to be residing.

4. A pneumatic memory according to claim 3 characterized further in that said discs are provided with passage means in communication with each pair of said holes, and wherein there is further provided means for forcing fluid through said passage means so that it escapes through the ports which are not closed by a ball, and readout means responsive to the escape of fluid from each open port for indicating the binary storage status of the pair of holes associated with each said open port.

5. A pneumatic memory according to claim 4 wherein said readout means comprises individual transducers each associated with one of said rows of ports and providing an electrical signal indicative of said binary storage status.

6. A pneumatic memory according to claim 5 wherein each transducer comprises a stationary fluid vessel positioned so that its opening will communicate successively with the ports of the associated row as said discs rotate, a coil for producing said electrical signal, a magnet inductively coupled to said coil, and means responsive to an increase in pressure in said fluid vessel caused by the escape of fluid from an associated port for causing relative movement between said coil and said magnet.

References Cited

UNITED STATES PATENTS 1,110,872 9/1914 Borschneck __________ 340—173
3,151,623 10/1964 Riordan.

TERRELL W. FEARS, Primary Examiner

U.S. Cl. X.R.

137—554; 235—201